$$\text{United States Patent Office}$$

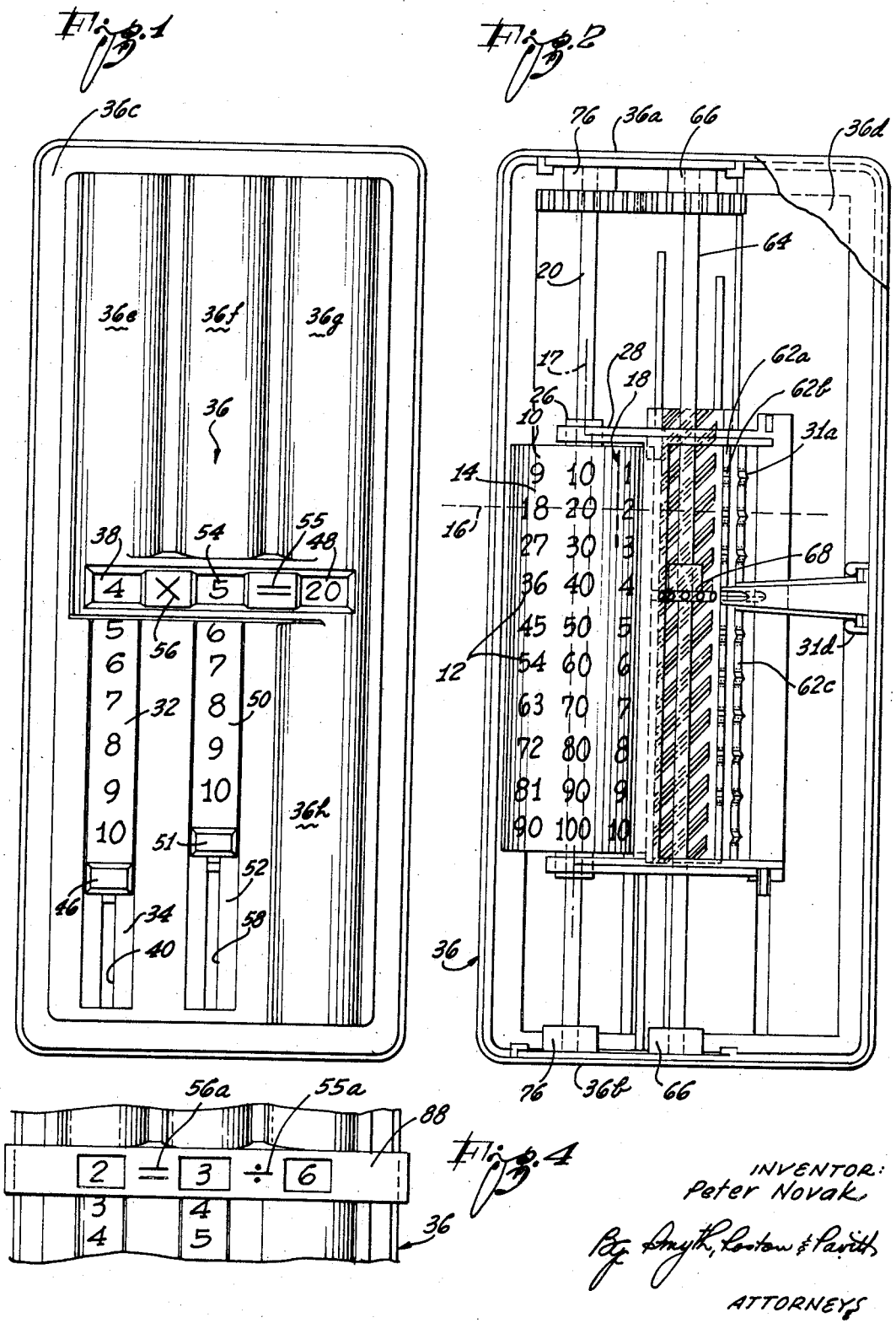

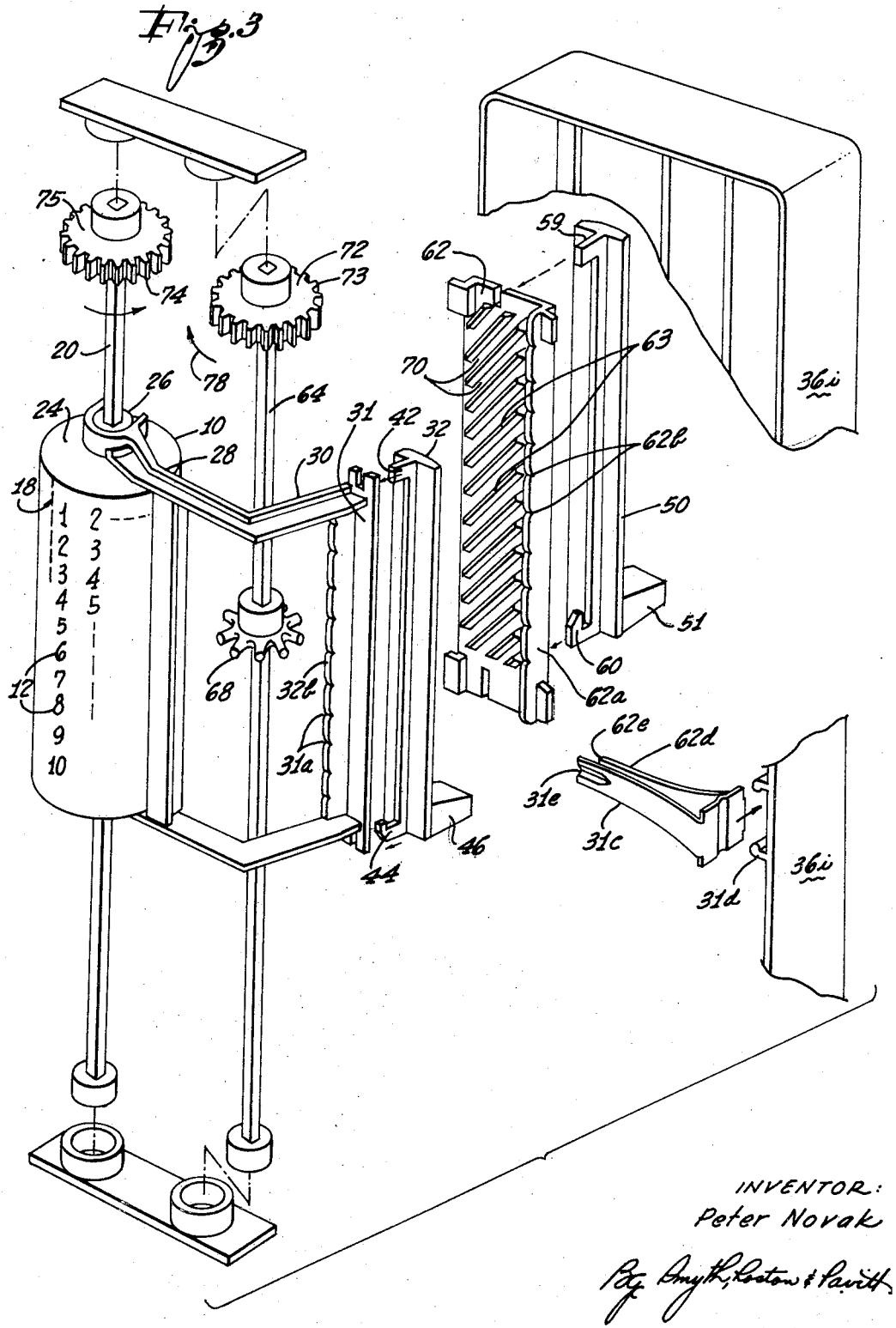

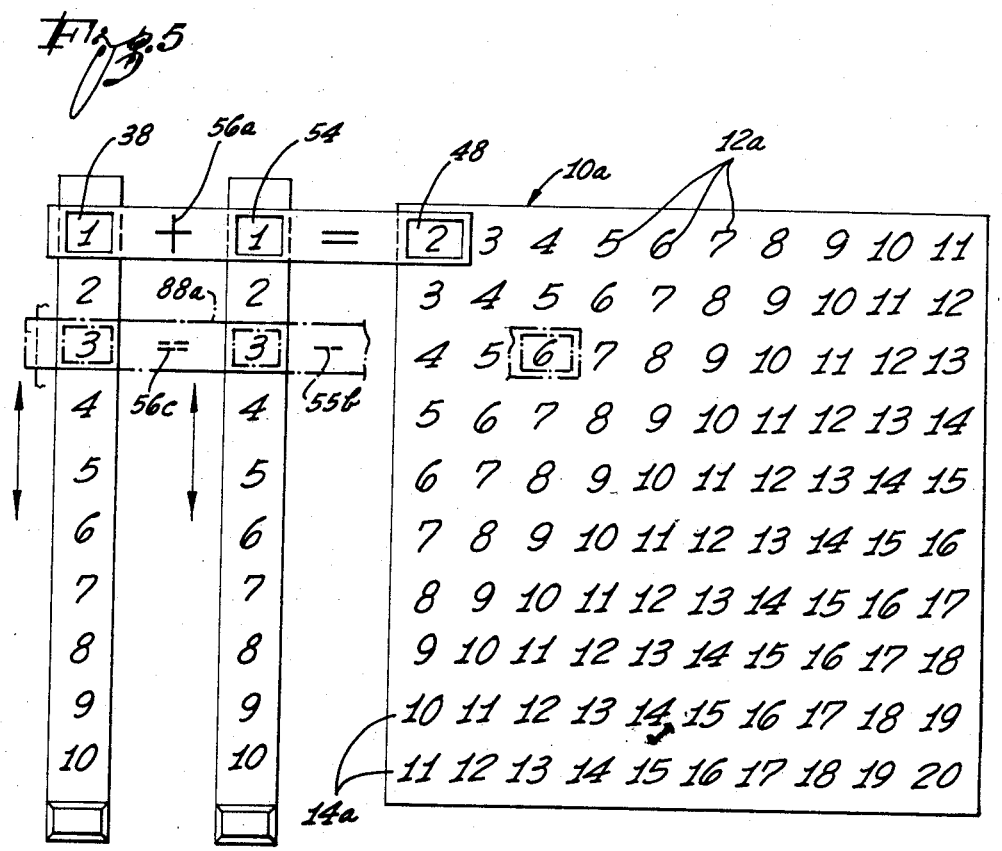

3,491,460
Patented Jan. 27, 1970

3,491,460
MATHEMATICAL INSTRUCTIONAL DEVICE
Peter Novak, 633 S. Pasadena, Apt. 22,
Glendora, Calif. 91740
Filed June 19, 1968, Ser. No. 738,160
Int. Cl. G09b 19/02
U.S. Cl. 35—31                                                            7 Claims

ABSTRACT OF THE DISCLOSURE

The device employs three windows, in the first of which a multiplicand is presented; in the second, a multiplier; and in the third, the product of the multiplicand and multiplier exposed in the first and second window. A series of multiplicands and of multipliers appear on two elongate elements, each slidable past its respective window. The products of the multiplicand and multiplier are disposed in rows circumferentially and progressively on a cylinder which is connected with a multiplicand slider element to move axially therewith; and the cylinder is rotated by gear means actuated by movement of the multiplier element, thereby to present in the third window the appropriate product number. By modification of the equation signs and reverse reading, the device may be adapted to show the divisional process; and by changing the multiplication sign to a plus or minus sign and appropriately changing the numbers of each row of the cylinder, the device may further be adapted to accomplish addition or substraction.

BACKGROUND OF THE INVENTION

Field of the invention

This invention relates to mathematical instructional devices in general and in particular to that type of device which may either be employed primarily for elementary mathematical instructional purposes or used for amusement as a toy. The present invention is directed to a very simple construction of a device to present addition, subtraction, multiplication and division tables in such facile and appealing manner as to induce a child to desire to learn such tables quickly and permanently.

Description of the prior art

While the objects of the present invention appear to have been long sought by prior patentees, none of the latter to the knowledge of the present applicant, has disclosed any device which accomplishes as readily the mathematical operations possible with a device constructed in accordance with the present invention. Thus, the patent to H. J. Kinney, No. 1,479,992, issued in 1924, reveals what is termed a "Mathematical Game Apparatus" by which simple addition up to totals of 20 may be accomplished, for the instruction and amusement of children. The disclosed mechanics is entirely different from the embodiment of the invention hereinafter more fully disclosed, and, in any event, does not accomplish multiplication or division.

Other patents which have been turned up through a preliminary search of the present invention and are specifically directed to educating a child in the art of multiplication are as follows:

Medlock, No. 2,618,868; Bolognino, No. 2,624,126; Goodwin, No. 2,643,467; Poole, No. 2,795,862; Parkhurst, No. 2,945,303; Moran, No. 3,025,612.

Each of these patents, however, discloses a multiplication device which appears to be considerably more complex than that of the present invention, and hence would be far more difficult and costly to manufacture. Such prior art devices, therefore, would not appear to be widely distributable among children for educational and amusement purposes. The very simple construction of the present invention renders it relatively inexpensive to manufacture so that it may be sold at a price charged for most simple mechanical toys. Its ease of use for instruction in addition, subtraction, multiplication and division tables is such that its operation may readily be grasped by any child as soon as he learns numbers up to 100. Further, it is particularly useful and instructive in teaching a child the relationship between multiplication and division and addition and subtraction.

SUMMARY OF THE INVENTION

The simplicity of the construction of a device made in accordance with the present invention results from disposing the products of any multiplicand and a given series of progressively greater multipliers, circumferentially of a cylinder in an alignment with a plane normal to the axis of the cylinder. Additional series of products of progressively greater or lesser multiplicands and the same multipliers may also be disposed on the circumference of the cylinder, each such series being aligned about a similar plane located a predetermined distance axially from the plane of the adjacent series of products.

The cylinder may be connected with an elongated element on which appear progressively the selected group of multiplicands. This elongated element moves past a window to expose one at a time each of its multiplicands. Through its connection with the cylinder for movement on a spindle lying in the cylinder axis in such a manner as to position for viewing through a product window one of the series of products of the multiplicand exposed in the multiplicand window. Selection of the product appropriate for such multiplicand and the particular multiplier which is exposed through a multiplier window is accomplished by movement of a second elongate element on which appear the preselected series of multipliers. As the second element is moved to expose each of its different multipliers, such movement, through angular gearing interposed between the second element and the cylinder, causes the cylinder to rotate and thereby to expose in the product window the proper product of the exposed multiplicand and exposed multiplier. All of the moveable components are comprehended in a housing which provides the three windows to expose the selected multiplicand and multiplier and the resulting product.

The two elongated elements, cylinder, gearing and housing all may be molded of plastic and the spindles for the cylinder and gearing may be constructed of small rigid metallic rods.

The essence of the present invention, then, is to dispose all of the products of preselected multiplicands and multipliers on a cylinder in a pattern whereby the proper product or any given multiplicand and multiplier may be presented, and such presentation is accomplished by mechanical movement of the cylinder both axially and in rotation in response to movement of the elements bearing the numbers of the multiplicands and multipliers. While such product selection may be accomplished by a number of different mechanical expedients, the preferred embodiment of the present invention is disclosed in the drawings and more fully discussed hereinafter. Devices constructed in accordance with the present invention may also be made to accomplish division by considering the product window as the dividend, the multiplier window as exposing the selected divisor and the multiplicand window then to present the proper quotient for the preselected exposed dividend and divisor. For such use, the equation signs should be modified and the division equation read in the opposite direction. The device may also be readily adapted to present addition or subtraction tables by simply changing the numbers on each row of the cylinder.

BRIEF DESCRIPTION OF THE DRAWING

FIG. 1 is a plan view of the multiplication device;

FIG. 2 is a perspective view of the underside of the device with the bottom cover removed;

FIG. 3 is an exploded view of the assembly shown in FIG. 2;

FIG. 4 is a modification of FIG. 1 to illustrate use of the device thereof for division;

FIG. 5 is a partial plan view similar to FIG. 1, but with the cylinder surface rolled out and displaying numbers representing sums rather than products of the combinations possible for the two sliders.

DESCRIPTION OF THE PREFERRED EMBODIMENT

The device in its preferred embodiment comprises a simple package assembly as illustrated in FIG. 1. However, to understand its construction and operation, resort must be had to FIGS. 2 and 3 of the drawing. The cylinder 10 bears on its surface a plurality of numbers 12. In the pattern of such numbers in the FIG. 1 embodiment, there are ten circumferential rows 14, each of which rows is disposed about a plane 16 normal to the cylinder axis 17 and is separated axially from each adjacent row by a substantially equal distance. Each row 14 is comprised of a series of equiangularly spaced numbers 12, comprising the products of one multiplicand selected from the numbers 1 through 10 and a series of multipliers 1 through 10 in progression. All of the product progressions of the rows 14 are linearly co-aligned commencing with the smallest product at the dotted line 18 and extending 360 degrees around the cylinder surface to dispose the largest product on the opposite side of the dotted line 18.

The cylinder 10 is slidably mounted on a coaxial spindle 20 of polygonal cross section, such as a square, in the illustrated embodiment, in such a manner as to be rotatable with the spindle 20. To accomplish such mounting, each end 22 of the cylinder 10 is closed by a centrally orificed circular plate 24 to which is coaxially secured an outwardly extending sleeve 26 having an internal configuration conforming to the cross section of the spindle 20 and dimensioned to fit closely, yet slidably, thereabout.

Each sleeve 26 is journalled for rotation within a U-shaped terminal of one arm 28 of a yoke-like bracket 30 extending from a base member 31 attached to the multiplicand slider indicator 32. The latter comprises an elongated element which is slidably disposed in a recess 34 in the face of the housing 36, in direction parallel to the axis of the cylinder 10 and to the spindle 20, and is adapted to slide past a first window 38 into an arcuately covered portion 36e of the housing 36. The recess 34 is centrally slotted at 40 to permit an interlocking attachment to be made by elements 42 and 44 between the base member 31 of the bracket 30 and the slider indicator 32. The face of the latter bears a progression of the numbers 1 through 10 and the lower end thereof is provided with a finger gripping tab 46. Thus, any movement of the slider 32 in its recess 34 results in a concomitant sliding movement of the cylinder 10 on its spindle 20 past a product window 48 in the housing 36, thereby to expose one number on the surface of the cylinder.

To produce in the window 48 the proper numerical product of the multiplicand exposed in the first window 38 and a preselected multiplier of from one to ten, a second slider 50 with a finger gripping tab 51 similar to the slider 32 with its tab 46, is provided to move in a slotted recess 52 similar to recess 34 past a multiplier window 54 in the housing 36. Recess 52 and its window 54 are disposed between multiplicand slider 32 and its window 38 and the cylinder 10 and its product window 48. On the face of the housing 36, a multiplication sign 56 is interposed between multiplicand and multiplier windows 38 and 54 respectively, and an equal sign 55 is placed between windows 54 and 48, thereby setting up the simple multiplication equation.

The multiplier slider 50 is fixedly connected through the slotting 58 in the recess 52 by elements 59 and 60 to an angular gear plate 62, so that the latter moves slidably with the sliding movement of the slider 50. The gear plate 62 is preferably molded of a plastic such as polystyrene or high impact polyethylene to provide a series of short ridges 63 set at an angle of approximately 25 degrees with respect to the axis of the cylinder 10.

The cylinder 10 is set in such a manner that when the numeral 1 appears in the multiplicand window 38 and the numeral 1 appears in the multiplier window 54, the numeral 1 on the top row of the cylinder 10 appears in the window 38. As the slider 32 is moved progressively through the numbers 2 through 10, it simultaneously moves the cylinder 10 on the spindle 20 so that the first numeral in each product row 14 to the right of dotted line 18 on cylinder 10 comprising the identical numbers 2 through 10 appears in the window 48, thereby indicating in the latter the proper products for each of the multiplicands 1 through 10 when multiplied by the multiplier 1.

However, when the multiplier appearing in the window 54 is changed to another numeral than 1, it is necessary to rotate the cylinder 10 to present in the window 48 a product numeral from the particular row 14 corresponding to the multiplicand exposed in window 38, appropriate for the multiplier so exposed in window 54. To accomplish this rotation a second spindle 64 is disposed within the housing 36 parallel to the spindle 20 and journalled at each end for rotation in sockets 66 provided in opposite end walls 36a, 36b of the housing 36. A pinion gear 68 is placed on the spindle 64 to rotate therewith and disposed with its teeth engaging the top several valleys 70 between the ridges 63 on the gear plate 62. Also provided on, and to rotate with the spindle 64 is a gear 72 the teeth 73 of which engage the teeth 74 a gear 75 fixedly secured to spindle 20 to rotate therewith. The latter is similarly journalled for rotation in sockets 76 provided the end walls 36a, 36b of the housing 36.

With the gearing arrangement thus described and interposed between the multiplier slider 50 and the cylinder 10, it may be seen that sliding movement of the slider 50 carries with it a lineal movement of the gear plate 62 in a direction parallel to the spindle 64. Through the engagement of the teeth of the pinion gear 68 with the projecting ridges of the gear plate, the spindle 64 is caused to rotate in the direction of the arrow 78, producing, through engagement of the two gears 72 and 75, a counter rotation of the spindle 20, and hence, of the cylinder 10. Thereby, the cylinder 10 is so angularly positioned as to present in the window 48 the proper numeral constituting the product of the multiplicand, determined by the vertical setting of the slider 32 carrying with it the positioning of the cylinder 10 to align with the window 48 the product row 14 for such multiplicand, and the multiplier exposed in the window 54, which product is found on such thus selected product row 14.

The base member 31 is preferably molded with an inner series of notches 31a each of which is so located as to correspond with the proper positioning of one of the rows 14 of numerals on the cylinder surface with respect to the product window 48. Similarly the gear plate 62 is molded with an upwardly projecting wall 62a with similar series of notches 62b each of which is so located as to correspond with the proper positioning in the window 54 of one of the multipliers on the slider 50. The wall portions 31b and 62c extending between the notches 31a and 62b respectively are convexly formed. To insure that when the cylinder 10 is moved axially in correspondence with the movement of the slider 32 it presents numerals centrally positioned in the respective windows 48 and 38, and that when the slider 50 is moved in the recess 52 it also presents in the window 54 a centrally positioned multiplier numeral, a pair of detent-tipped cantilevered spring elements 31c, 62d are anchored in a mounting 31d the side wall 36i of the housing 36, and extend into contact with the notches 31a and 62b respectively in the base member 31 and wall 62a respectively. These spring elements 31c and 62d are biased in the direction of the notches which their detents 31e and 62e respectively contact. Thereby, any force applied to either the slider 32 or the slider 50 tends to cause it to move intermittently from one of its respective notches to the next progressively, and thereby present in its respective window 38 or 54, a centrally positioned numeral.

The housing 36 is preferably molded of a rigid plastic material in an attractive and generally symmetrical form, and includes both an upper portion 36c and a bottom cover 36d. The apparent thickness of the housing may be diminished somewhat by providing the arcuate or cylindrically shaped raised areas 36e, 36f, 36g in the top housing portion 36c and a similarly shaped portion 36h in the bottom cover 36d.

The raised areas 36e and 36f permit the sliders 32 and 50 to move longitudinally within the housing portion 36c, while the raised areas 36g and 36h serve to permit the cylinder to slide axially on its spindle 20 within, and without contacting the inner walls of the housing 36.

While FIGS. 1 through 3 as hereinabove explained disclose a multiplication device, it will be readily apparent that the same principles of construction with minor adaptation may be applied to produce a device for presenting instruction in short division. For example, as shown in FIG. 4, if the window 48 is utilized to display a dividend; the window 54, a divisor; the window 38 then discloses the quotient of the division of numbers exposed in windows 48 and 54. For such utilization, it is only necessary to change the equal sign 55 in FIG. 1 to a divisional sign 55a (FIG. 4), and the multiplication sign 56 (FIG. 1) to an equal sign 56a (FIG. 4), and to read the equation from right to left. A snap-in plate 88 may be provided to accomplish such adaptation for division.

Further, it will be readily apparent that one may adapt the disclosed device to the multiplication or division of different selected groups of numbers other than those of multiplicands (or quotients) and multipliers (or divisors) of the numerals from 1 through 10, by simply providing different other preselected numerals on the sliders 32 and 50, and appropriate products (or dividends) on the cylinder 10.

FIG. 5 represents a further adaptation of the present invention to present addition and subtraction tables. In this adaptation the numbers 12a on the cylinder 10a are selected in each row 14a as representing sums of the numbers which are made to appear in windows 38 and 54 instead of products as in the FIGS. 1–4 embodiment. The multiplication sign 56 is then changed to a plus sign 56b, thereby setting out the correct equation. The movement of the sliders 32 and 50 serves in the same manner to shift the cylinder axially and to rotate it as in the FIGS. 1–4 embodiment, but now to present the proper sum rather than product in the window 48. Again by changing the plus sign 56b to an equal sign 56c, and the equal sign 55 to a minus sign 55b, as by a snap-in plate 88a, and reading from right to left, a subtraction equation is presented.

It will be readily appreciated that a device constructed in accordance with the present invention may be utilized to teach both multiplication and division and addition and subtraction if the cylinder 10 on which rows of product numerals are disposed, is replaceable by another cylinder 10a of the FIG. 5 embodiment and the multiplication sign is changed to an addition sign by clipping in another snap-in plate similar to 88 or 88a.

From the foregoing detailed description of the preferred embodiment of the invention illustrated in the drawings, it may be seen that an instructional or entertaining type of mathematical device may be practically and relatively inexpensively constructed so that it may be sold for use by children at prices which most people and public school institutions can readily afford. Devices made according to the present invention could thus become standard instructional material in the lower grades of schools, or they could be widely made available by parents to children of early school age to accelerate their instruction in addition, subtraction, multiplication and division tables.

It will also be readily apparent to those skilled in the art that various modifications may be made in the connecting, gearing and actuating mechanisms of the preferred embodiment illustrated in the drawing and hereinabove described without departing from the principles of the present invention. All such adaptations and modifications are, however, intended to be comprehended within the scope of the following claims.

I claim:
1. A mathematical device comprising:
 (A) a series of first, second and third windows, said windows having a predetermined co-alignment in reference to each other;
 (B) a first element, said element bearing a first series of numbers, said first element being movably disposed in relation to the first window to expose said numbers progressively;
 (C) a second element, said element bearing a second series of numbers, said second element being movably disposed in relation to the second window to expose said second series of numbers progressively;
 (D) a rotatable cylinder movable axially and bearing circumferentially in a predetermined axial and circular pattern, a plurality of third series of numbers, each of said third series bearing a predetermined mathematical relationship to a preselected one of said first series of numbers and said second series of numbers in progression; said cylinder being so disposed in relation to said third window as to expose one of its said numbers of the said plurality of series determined by the exposure of one of said first series of numbers in said first window, and of said second series of numbers in said second window; said cylinder further being connected to one of said elements to be moved axially with movement of said one element to expose progressively its numbers in one said window; and
 (E) gear means interposed between the other of said elements and the said cylinder, to rotate in response to movement of the other element to expose progressively different numbers through its window; whereby the proper mathematically related number of the appropriate one of said third series of numbers on the cylinder is exposed in the third window, as determined by the exposure in the first and second windows of any particular combination of numbers.

2. The device according to claim 1 in which the cylinder bearing the plurality of the third series of numbers bearing a predetermined relationship to preselected combinations of numbers of the first and second series of numbers is replaceable by another cylinder bearing a plurality of third series of numbers bearing a different predetermined relationship to the same preselected combinations of the first and second series of numbers.

3. A multiplication device comprising:
 (A) a series of first, second and third windows, said windows having a predetermined co-alignment in reference to each other;
 (B) a first element, said element bearing a first series of numbers constituting multiplicands, said first element being movably disposed in relation to the first window to expose said multiplicands progressively;
 (C) a second element, said element bearing a series of numbers constituting multipliers of each of the said multiplicands, said second element being movably disposed in relation to the second window to expose said multipliers progressively;

(D) a rotatable cylinder movable axially and bearing circumferentially in a predetermined axial and circular pattern, a plurality of series of numbers, each series constituting the products of a preselected one of said multiplicands and said multipliers in progression; said cylinder being so disposed in relation to said third window as to expose one of its said numbers of the said several series determined by the exposure of a preselected multiplicand in said first window, and multipliers in said second window; said cylinder further being connected to one of said elements to be moved axially with movement of said one element to expose progressively its numbers in one said window; and (E) gear means interposed between the other of said elements and the said cylinder, to rotate in response to movement of the other element to expose progressively different numbers through its window; whereby the proper product of the appropriate series of numbers on the cylinder is exposed in the third window, as determined by the exposure in the first and second windows of any particular combination of numbers constituting a multiplicand and multiplier.

4. A multiplication device comprising:

(A) a series of first, second and third windows, said windows having a predetermined co-alignment in reference to each other;

(B) a first element, said element bearing a first series of numbers constituting multiplicands, said first element being movably disposed in relation to the first window to expose said multiplicands progressively;

(C) a second element, said element bearing a series of numbers constituting multipliers of each of the said multiplicands, said second element being movably disposed in relation to the second window to expose said multipliers progressively;

(D) a rotatable cylinder movable axially and bearing circumferentially in axial progression a plurality of series of numbers, each number of said series constituting the products of a preselected one of said multiplicands and one of said series of multipliers; said cylinder being so disposed in relation to said third window as to expose one of its said numbers of that series determined by the exposure of the preselected multiplicand in said first window, said cylinder further being connected to one of said elements to be moved axially with movement of said one element to expose progressively its numbers in said third window; and (E) gear means interposed between the other of said elements and the said cylinder, to rotate the latter in response to movement of the other element to expose progressively different numbers through its window; whereby the proper product of the appropriate series of numbers on the cylinder is exposed in the third window, as determined by the exposure in the first and second windows of any particular combination of numbers constituting a multiplicand and multiplier.

5. A multiplication device comprising:

(A) a series of first, second and third windows having a predetermined co-alignment in reference to each other;

(B) a first elongated element, said element bearing a first series of numbers constituting multiplicands, said first element being slidably disposed in relation to the first window to expose said multiplicands progressively;

(C) a second elongated element, said element bearing a series of numbers constituting multipliers of each of the said multiplicands, said second element being slidably disposed in relation to the second window to expose said multipliers progressively;

(D) a rotatable cylinder movable axially and bearing circumferentially in axial progression a plurality of series of numbers, each series constituting the products of a given multiplicand and a progression of said multipliers exposed in the second window by slidable movement of the second element; said cylinder being so disposed in relation to said third window as to expose one of its said numbers of that series determined by the exposure of the multiplicand in the first window; said cylinder further being connected to said first element to be slidable axially with sliding movement of the first element to expose progressively said multiplicands in the first window and thereby expose in the third window progressively the appropriate series of product numbers; and (E) gear means interposed between the second element and the said cylinder, to rotate the latter in response to a sliding movement of the second element to expose progressively different multipliers in the second window; whereby the proper product of the appropriate series of numbers on the cylinder is exposed in the third window, as determined by the exposure in the first and second windows of any particular combination of multiplicands and multipliers.

6. The device as described in claim 5 wherein the gear means comprises:

(A) a pair of first and second rotatable spindles, the first spindle being coaxially and fixedly secured to the cylinder to rotate therewith; the second spindle being disposed in parallel relationship to the first spindle and to the path of movement of the second element;

(B) the second element having a plurality of angular parallel ridges and valleys, planes through which intersect both spindles at an acute angle;

(C) a first pinion coaxially and fixedly disposed on the second spindle to rotate therewith, said first pinion having teeth engageable with said ridges and valleys;

(D) second and third interengaging pinions, one of the latter being fixedly disposed on each of said spindles to rotate therewith;

whereby the axial movement of the second element effects, through the interengagement of the teeth of the first pinion with said ridges and valleys on the second element, a rotation of the second spindle, and, through the interengagement of the second and third pinions, a rotation of the first spindle, and hence of said cylinder; thereby to expose different numbers of the series of numbers determined by the exposed multiplicand and corresponding to the exposed multipliers.

7. A device to perform multiplication and division operations, said device comprising:

(A) a series of first, second and third windows, said windows having a predetermined co-alignment in reference to each other;

(B) a first element, said element bearing a first series of numbers constituting multiplicands or quotients, said first element being movably disposed in relation to the first window to expose said multiplicands or quotients progressively;

(C) a second element, said element bearing a series of numbers constituting multipliers of each of the said multiplicands or divisors of a dividend, said second element being movably disposed in relation to the second window to expose said multipliers or divisors progressively;

(D) a rotatable cylinder movable axially and bearing circumferentially in a predetermined axial and circular pattern, a plurality of series of numbers, each series constituting the products of a preselected one of said multiplicands and said multipliers in progression; said cylinder being so disposed in relation to said third window as to expose one of its said numbers of the said several series determined, when a multiplication operation is being performed, by the exposure of a preselected multiplicand in said first window, and multipliers in said second window or when a division operation is being performed, by its selection as the dividend to be divided by a preselected divisor; said cylinder further being connected to one of said elements to be moved axially with movement of said one element to expose progressively its numbers in said third window; and (E) gear means interposed between the other of said elements and the said cylinder, to rotate in response to movement of the other element to expose progressively different numbers through its window; whereby, in the case of multiplication, the proper product of the appropriate series of numbers on the cylinder is exposed in the third window, as determined by the exposure in the first and second windows of any preselected combination of numbers constituting a multiplicand and multiplier; and in the case of division, the proper quotient appears in the first window for the preselected dividend and divisor.

References Cited

UNITED STATES PATENTS 1,683,733  9/1928  Sewall _____ 35—76
2,945,303  7/1960  Parkhurst.

EUGENE R. CAPOZIO, Primary Examiner

W. H. GRIEB, Assistant Examiner

U.S. Cl. X.R.

235—69, 79